Aug. 18, 1970 R. C. JABLONSKI 3,525,077

BLOCK PARITY GENERATING AND CHECKING SCHEME FOR MULTI-COMPUTER SYSTEM

Filed May 31, 1968 6 Sheets-Sheet 1

INVENTOR
ROBERT C. JABLONSKI

BY Kenneth T. Grace
ATTORNEY

INVENTOR
ROBERT C. JABLONSKI
BY Kenneth T. Grace
ATTORNEY

INVENTOR
ROBERT C. JABLONSKI
BY Kenneth S. Grace
ATTORNEY

INVENTOR
ROBERT C. JABLONSKI
BY Kenneth S Grace
ATTORNEY

INVENTOR
ROBERT C. JABLONSKI
BY Kenneth T Grace
ATTORNEY

INVENTOR
ROBERT C. JABLONSKI
BY Kenneth T. Grace
ATTORNEY

United States Patent Office 3,525,077

Patented Aug. 18, 1970

3,525,077

BLOCK PARITY GENERATING AND CHECKING SCHEME FOR MULTI-COMPUTER SYSTEM

Robert C. Jablonski, Minneapolis, Minn., assignor to Sperry Rand Corporation, New York, N.Y., a corporation of Delaware Filed May 31, 1968, Ser. No. 733,544
Int. Cl. G06f *11/10, 15/16*
U.S. Cl. 340—172.5 2 Claims

ABSTRACT OF THE DISCLOSURE

A scheme for generating and checking the block parity of multicharacter messages transmitted between computer sites in a multi-computer data processing system. Each of the computer sites includes a computer, a variety of associated on-site input-output equipment and a plurality of communication systems each of which communication systems intercouples two computer sites. The communication systems at each site are combined in a Data Communication Subsystem (DCS) which includes a Line Terminal Controller (LTC), for communication to the associated computer, and a plurality of input-output Line Terminals (IT) for communicating to the associated transmission line. Generally, intermediate each Line Terminal and the associated transmission line are a Modem and a Communication Interface (CI) for providing the necessary adjustment of the particular message type to the particular associated transmission line type. In the prior art, each Line Terminal included the necessary hardware to separately perform its own message block parity generation and checking. The present invention relates to a scheme and an algorithm for utilizing both the individual Line Terminal and the Line Terminal Controller to achieve block parity (LRC) generation and checking for both input and output message transfers whereby each character is gated from the Line Terminal to the Line Terminal Controller wherein a half-add is performed in the Line Terminal Controller on the character and whereby the new parity sum is then returned to the Line Terminal during each character time.

BACKGROUND OF THE INVENTION

The present invention is directed toward a multi-computer data processing system operating in real time wherein a plurality of independently operable Remote Computers, at a plurality of Remote Sites, communicate with an independently operable Central Computer, at a Central Site. Each of the computer sites includes a computer, one or more Input-Output Devices and a Data Communication Subsystem which couples the associated computer to a plurality of communication links or Transmission Lines. The Data Communication Subsystem (DS) includes a Line Terminal Controller (LTC) for communication with the associated computer, and a plurality of parallel arranged Input-Output Line Terminal (LT) pairs. Generally, intermediate each Line Terminal and the associated Transmission Line are a Modem and a Communication Interface (CI) for providing the necessary adjustment of the particular message type to the particular associated transmission line type.

The Line Terminals are logic packages designed to perform simplex data communication via a communication path such as a telegraph or a telephone line or other communication facility. Receive and transmit, input and output, Line Terminals may be interconnected in pairs to provide half, or full duplex communication where required. A wide variety of Line Terminals may be provided to accommodate communication over most available communication facilities and methods. Thus, each Line Terminal is particularly adapted for its associated Transmission Line type. As an example, low speed communication Line Terminals are intended for telegraphic and low speed data communication by means of DC signaling or by means of Modems coupled to voice grade, low grade or narrow band transmission lines. Such low speed communication Line Terminals normally transmit messages in a character serial, character bit serial stream at a transmission rate of 200 baud or less. In contrast, synchronous communication Line Terminals are intended for high speed data communications by means of Modems coupled to high grade, such as Telpak lines, or to voice grade, transmission lines. Such data transmission is transmitted character serial, character bit serial at a transmission rate of 2K baud to 230.4K baud.

The Modems and their associated Communication Interfaces are of many varieties, each of which is particularly adapted for intercoupling its associated Line Terminal and the associated transmission line type. As an example, a low speed communication Line Terminal for Data Phone service over leased commercial telephone lines may be coupled to its associated transmission line type by a Bell Data Set 103A Modem and a Univac F 1002–04 Communication Interface.

Generally speaking the multi-computer data processing system into which the present invention is incorporated operates in real time whereby a transmitting computer accepts its information from its associated Input-Output Device, transmits its information in a character serial, character bit parallel message format to its associated Data Communication Subsystem whereby such message, in accordance with the particular type of transmission intended, is gated to a particular Line Terminal, and perhaps its associated Modem and Communication Interface, whereupon the message is transmitted over its associated transmission line in a character serial, character bit serial message format. A similar arrangement exists at the receiving computer whereby the associated Line Terminal, and perhaps its associated Modem and Communications Interface, reconverts the received information from the character serial, character bit serial message format to the character serial, character bit parallel message format. In a synchronous system it is customary for the transmitting site to precede the transmission of the information with synchronization (SYN) characters for purposes of synchronizing the transmitting and receiving sites. These synchronization characters are followed by a start of message (SOM) character which is immediately followed by a series of data (DATA) characters which, in turn, are immediately followed by an end of message (EOM) character and then a block parity (LRC) character The receiving site identifies and reacts uniquely for each of the various character forms.

In many prior art multi-computer data processing systems not utilizing computer programmed parity checking, each Line Terminal included all the hardware sufficient to perform block parity generation and checking on each message transmitted and received therethrough. In a multi-computer data processing system wherein each site includes up to 16 Line Terminals, each Line Terminal including input and output circuitry, it was therefore necessary to provide 32 independent block parity generation and checking systems. The present invention, in contrast, permits a substantial reduction in block parity generation and checking hardware whereby, a Three Level Half-Adder, which performs successive half-adds on successive characters of the message, is placed in the single Line Terminal Controller with a relatively inexpensive block parity (LRC) Register provided each of the associated Line Terminals whereby each of the LRC Registers in each Line Terminal shares the common half-adder incorporated in the associated Line Terminal Controller.

SUMMARY OF THE INVENTION

The present invention relates to a scheme for generating and checking the block parity of multi-character messages transmitted between computer sites in a multicomputer data processing system. The scheme involves the location of a single Three Level Half-Adder in the single Line Terminal Controller that is coupled to up to 16 Line Terminals at each computer site. Each of the associated Line Terminals includes a block parity LRC register for holding the present block parity sum. As each character of the message passes through the transmitting Line Terminal Controller and the associated output Line Terminal circuitry, the latest block parity (LRC) sum, as held in the LRC Register in the Line Terminal, is added to the present character of the message in the Three Level Half-Adder in the Line Terminal Controller with the new LRC sum then passed from the Line Terminal Controller back into the Line Terminal and held in the LRC register as the new LRC sum. The receiving Line Terminal Controller, input Line Terminal circuitry combination performs a similar operation, half-adding each character, character by character, as it is received from the transmitting site. Upon receipt of the last character of the message, the receiving Line Terminal half-adds its generated block parity character (LRC) to the block parity character received from the transmitting Line Terminal with the resulting sum compared to zero (0); if the comparison is an equality, a Normal End status signal is generated, if a not-equal comparison is made, an Error Condition status signal is generated. The receiving site Line Terminal Controller, Line Terminal combination reacts in an appropriate manner to the so-generated status signal.

DESCRIPTION OF THE PREFERRED EMBODIMENT

Figure 1:
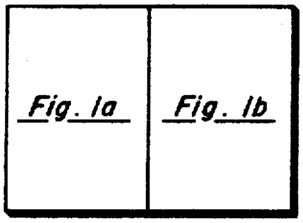
FIG. 1 is a block diagram of the arrangement of FIGS. 1*a*, 1*b*.
Figure 5:
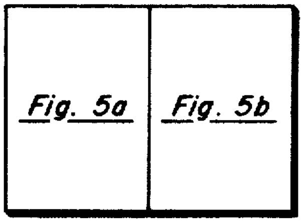
FIG. 5 is a block diagram of the arrangement of FIGS. 5*a*, 5*b*.

With particular reference to FIG. 1 there is presented a block diagram of a data processing system whereby a plurality of Remote Computers, at a plurality of Remote Sites, communicate with each other and with a single Central Computer, at a single Central Site, over respectfully associated communiction links comprised of a variety of transmission line types. Transmission is bidirectional whereby each independently operable computer has selective ready access, on a real time basis, to each of the other independently operable computers.

The illustrated embodiment of FIG. 1 is broadly composed of a plurality of Computer Sites; Central Site 10, Remote Site 12, and Remote Site 14, it being understood that only three sites 10, 12, 14 are illustrated for purposes of simplifying discussion of the present invention. For purposes of further clarifying the discussion of the present invention, site 10 is denoted as a Central Site 10 which is coupled to a plurality of Remote Sites 12, 14 each of which may be intercoupled to each other. Broadly speaking, all of the sites 10, 12, 14 may be of substantially similar equipment make-up except for variations in the Line Terminal requirements due to the peculiarities of the associated message and transmission line requirements. As an example, in the illustrated embodiment sites 10, 12, 14 may each include a Univac 9400 Computer which is coupled to a plurality of different Input-Output Devices such as a card punch/reader, magnetic tape unit, line printer, typewriter, magnetic drum, magnetic disc, paper tape punch/reader, etc. Central Computer 16 and Remote Computers 18, 20 may, in turn, be coupled to substantially similar Data Communication Subsystems (DCS) 28, 30, 32, each of which may have substantially similar conformations except for minor variations in the Line Terminal requirements due to the particularities of the individual transmit/receiver requirements. Accordingly, Data Communication Subsystems 28, 30, 32 may include substantially similar Line Terminal Controllers 34, 36, 38, each of which may be a Univac DCS–16 free standing Line Terminal Controller, each of which may accommodate up to 16 Line Terminals and their associated transmission lines.

Each Line Terminal Controller 34, 36, 38 of the associated Data Communication Subsystem 28, 30, 32 may be coupled in parallel to up to 16 Line Terminals and their associated transmission lines with the information that is to be transmitted being gated into only one of the parallel arranged Line Terminals. Each Line Terminal includes a transmit and receives, output and input, unit interconnected in a pair to provide half or full duplex communication as required. Such communication may be selectively by simplex or duplex data transmission via a communication path such as a telegraph or telephone line or other communication facility. The wide variety of transmit and receive Line Terminals provide features and selections appropriate for communication via most available communication facilities and methods. Such Line Terminals are generally classified by speed and method of communication.

The Line Terminals are generally coupled from their Communication Interface to the associated transmission line by a Modem which is a standard item of a Bell Telephone Company data communication system, and, consequently no detailed discussion of the operation of such Modems shall be given herein. For purposes of the present invention it is sufficient to state that each Modem couples a frequency modulated signal to the associated transmission line as a function of a digital input and, conversely, couples a digital signal to its associated Line Terminal as a function of a frequency modulated signal received from its associated transmission line.

Intermediate each Line Terminal and its associated Modem and/or transmission line is a Communication Interface (CI) which performs logic and electrical matching functions to convert signals between the Line Terminal and the associated Modem and/or transmission line. A Communication Interface may provide strapping selections which permit operation in simplex, half duplex or full duplex modes. Additionally, it may provide continuous carrier or control carrier for private line systems as well as control carrier for Data Phone service and unattended answering of Data Phone service calls and termination of such calls.

As the interface between the Line Terminal Controller and the associated transmission lines may be any one of several of many well known types, the associated elements and their typical uses are presented below in a summary form in Tables A and B. Such information is provided merely to illustrate the many types and uses of information communication possible between the coupled sites 10, 12, 14.

TABLE A

| LT, Univac No. | Modem, Bell Data Set | CI, Univac No. | Typical uses |
|---|---|---|---|
| F 1003-XX | 103A | F 1002-04 | Data Phone Service, public network, auto-calling, unattended answer; to 200 baud, half or full duplex, asynchronous. |
| F 1003-XX | 103F | F 1002-03 | Private line, up to 300 baud half or full duplex, asynchronous. |
| F 1005-XX | 201A3 | F 1002-04 | Data Phone Service, public network, auto-calling, unattended answer, 2000 baud, internal timing, half duplex, synchronous. |
| F 1005-XX | 201B1 | F 1002-03 | Private line, 2400 baud, internal timing, half or full duplex, synchronous. |
| F 1004-XX | 202C | F 1002-04 | Data Phone Service, public network, auto-calling, unattended answer, up to 1200 baud, half duplex, asynchronous. |
| F 1004-XX | 202D | F 1002-03 | Private line, up to 1,800 baud, half or full duplex, asynchronous. |
| F 1005-XX | 205B1 | F 1002-08 | Private line, 600, 1,200 or 2,400 baud, full duplex internal timing, synchronous. |
| F 1005-XX | 301B | F 1002-05 | Private line 40.8K baud, full duplex, internal timing, synchronous. |
| F 1005-XX | 303C | F 1002-05 | Private line 50K baud, full duplex, internal timing, synchronous. |
| F 1006-XX | 403A | F 1002-07 | Data Phone service, receive only, parallel 2 out of 8, 10 characters per second, unattended answering. |
| F 1005-XX | 303D | F 1002-05 | Private line, 230.4K baud, full duplex internal timing, synchronous. |
| F 1007-XX | Auxiliary 801A1 or 801 C 4. | F 1002-06 | Auto-calling unit, used with 103A, 201A3, 202C, 811B. |
| F 1003-XX | Auxiliary 811B. | F 1002-09 | TWX Network Interface, four-row TWX only. |

TABLE B

| LT, Univac No. | Telegraph | CI Univac No. | Typical uses |
|---|---|---|---|
| F 1003-XX | 20 ma. neutral | F 1002-00 | Private line telegraph, AT&T. |
| F 1003-XX | 50 to 75 ma. neutral. | F 1002-00 | Private line telegraph, AT&T. |
| F 1003-XX | 20 to 40 ma. polar | F 1002-00 | Private line telegraph, Western Union. |

Figure 2:
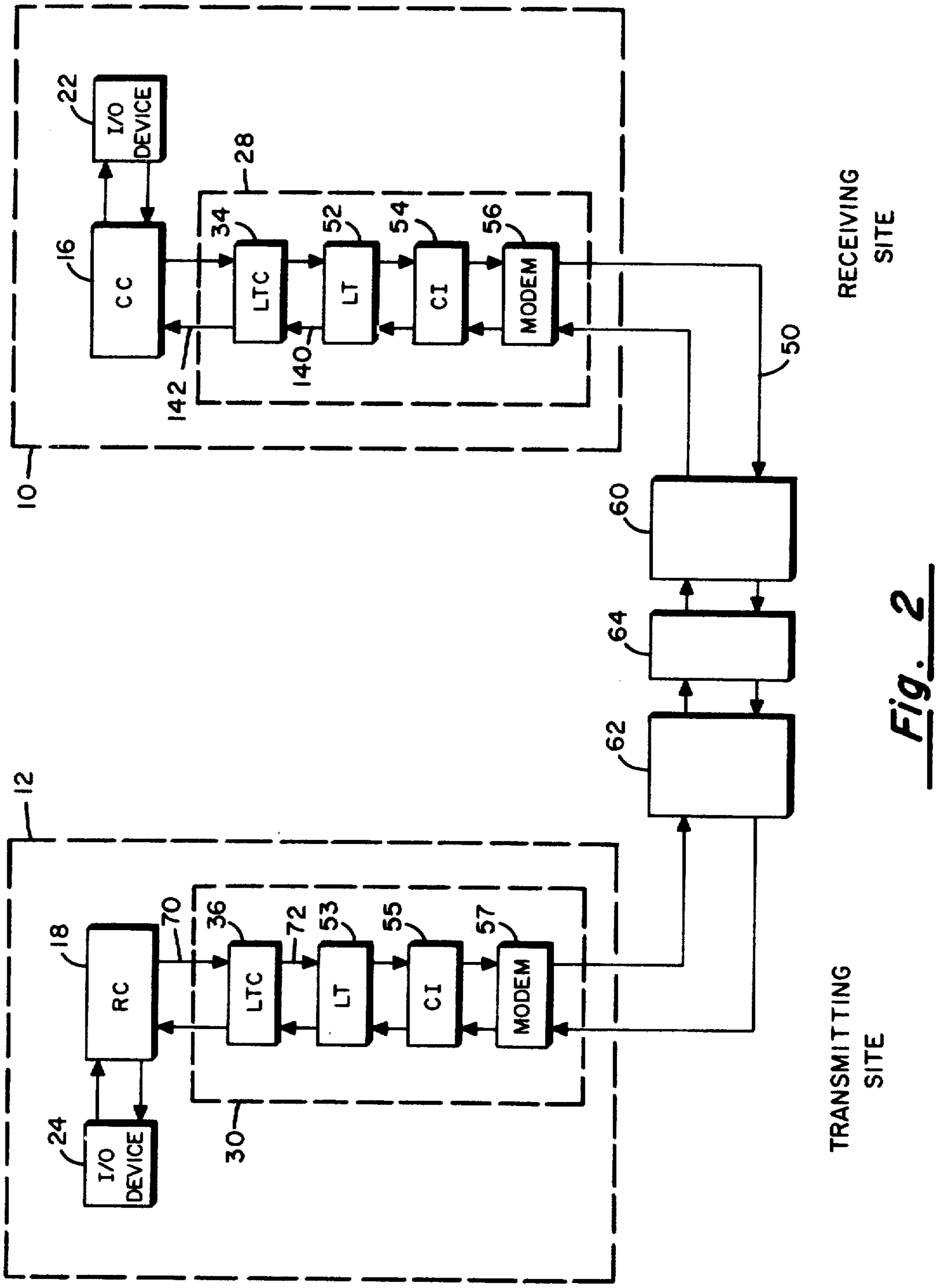
FIG. 2 is an illustration of the elements, comprising the transmitting and receiving sites, required for a message transmission.

Although many various system and equipment and arrangements are possible within the multi-computer data processing system illustrated in FIG. 1 only one typical system shall be explained in detail as an implementation of the present invention. With particular reference to FIG. 2 there is presented an illustration of a block diagram of one possible system arrangement for transmitting information between a transmitting Remote Site and a receiving Central Site. For purposes of the present discussion Central Site 10 (CS) and Remote Site 12 (RS) may be considered to be transmit/receive communication systems having substantially similar conformations intercoupled by a transmission line 50. Central Site 10 includes Central Computer 16 (CC) which is a Univac 9400 computer, a plurality of Input-Output devices 22 and a Data Communication Subsystem 28, which is a Univac Data Communication Subsystem T8575-01/03. Data Communication Subsystem 28 (DCS) includes a Line Terminal Controller 34 (LTC), which is a Univac DCS-16 controller, a transmit/receive Line Terminal 52 (LT), which is a Univac feature number F 1005-02, 03, a Communication Interface 54 (CI), which is a Univac feature number F 1002-05, and a Modem 56, which is a Bell Data Set 303C. Remote Computer 18 (RC), Line Terminal Controller 36 (LTC), Line Terminal 53 (LT), Communication Interface 55 (CI) and Modem 57, of Remote Site 12 (RS), are similar to their corresponding counterparts in Central Site 10. Transmission line 50, which couples Modem 56 of Central Site 10 to Modem 57 of Remote Site 12 is a four wire transmission line system leased from the Bell Telephone Company system and includes at least two transmission line portions 60, 62 implemented by a Bell system 758C Data Switcher 64.

The data processing system of FIG. 2 is a duplex, synchronous real time communication link transmitting data at a synchronous data rate of 50,000 bits per second (simplex). Information is transmitted in the following character forms;

Synchronization character (SYN)
Start of Message Character (SOM)
Data Character (DATA)
End of Message Character (EOM)
Block Parity Character (LRC)

and is character serial between Remote Computer 18 and Central Computer 16. Transmission between Central Computer 16 and Data Communication Subsystem 28 and between Remote Computer 18 and Data Communication Subsystem 30 is character bit parallel while communication between Data Communication Subsystem 30 and Data Communication Subsystem 28 is character bit serial. As stated above, the data processing system of FIGS. 1 and 2 are existing systems into which the block parity generating and checking scheme of the present invention is incorporated. The present invention consists of the incorporation of certain well-known logical elements in an existing system, i.e., a Three Lever Half-Adder in Line Terminal Controllers (LTC) 34, 36 and a block parity (LRC) Register in Line Terminals (LT) 52, 53.

For purposes of the present discussion Data Communication Subsystems 28, 30, may be considered to be a family of devices—see Tables A, B—that may be assembled into a Data Communication Subsystem that may be tailored to the particular requirements of the associated computer and the information transmission requirements. Data Communication Subsystems 28, 30 are usable for intercomputer communication as well as computer to Input/Output Device communication, while connections for these operations may be local (on-site) or remote (off-site) and may provide for from 1 to 16 lines of duplex communication. Such subsystems may include any of the elements noted in Tables A and B above. As such subsystems may be considered to be prior art arrangements into which the present invention is incorporated no detailed discussion thereof, except when necessary, shall be provided herein.

Figure 3:
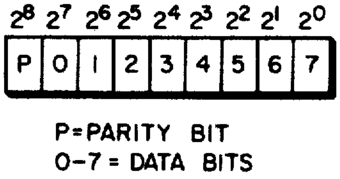
FIG. 3 is an illustration of the character format as transmitted between computer sites in the illustrated operation of the present invention.

Transmission over transmission line 50 is, as stated above, in a synchronous mode at a rate of 50,000 bits per second (simplex) as controlled by Central Site 10 and/or Remote Site 12. Communication between Remote Computer 18 and Line Terminal Controller 36 is in a character serial, character bit parallel message format in the $n+p$ bit character format illustrated in FIG. 3. The character format, from left to right, consists of a nine bit byte; a line parity bit P (28); and the 8 data bits 0–7 ($2^7$–$2^0$), where bit 0 is the highest ordered or most significant bit, and bit 7 is the lowest ordered or least significant bit, of the character. Transmission between Remote Site 12 and Central Site 10 over transmission line 50 is in a character serial, character bit serial message format in the 8 or $n$-bit character bit format of FIG. 3, i.e., data bits 0–7.

Figure 4:
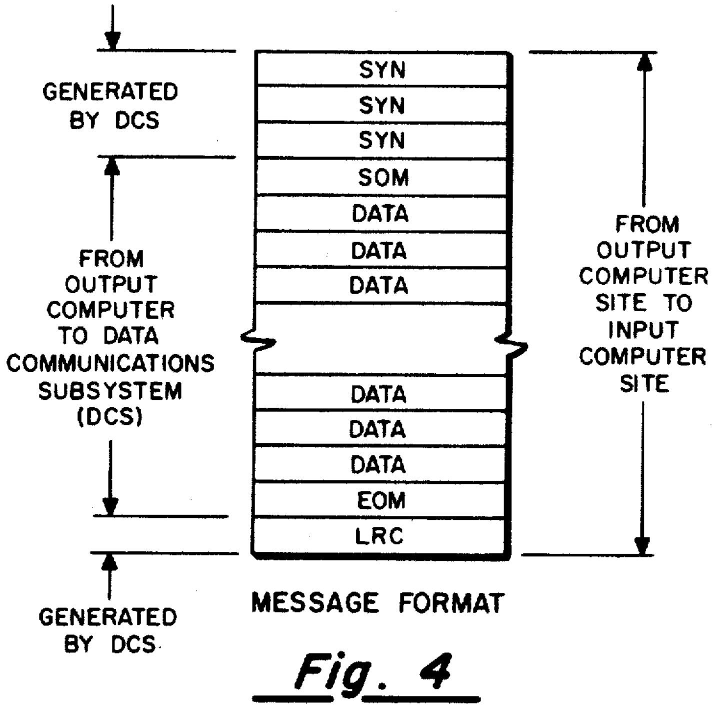
FIG. 4 is an illustration of the message format as transmitted between computer sites in the illustrated operation of the present invention.

Transmission of information, or a message, between Remote Site 12 and Central Site 10 has the general format illustrated in FIG. 4. It is to be appreciated that many preceding and succeeding control signals must pass between Central Computer 16 and Remote Computer 18 for the transmission of the message therebetween. However, for purposes of the present invention discussion of the illustrated embodiment shall be substantially limited to the transmission of the message format of FIG. 4. Initially, after the necessary conditioning of Central Site 10 and Remote Site 12 for a transmission therebetween, e.g., from Remote Computer 18 to Central Computer 16, Remote Site 12 transmits over transmission line 50, a multi-character message having the format of FIG. 4. This message format starts out with a series of 8 bit (see FIG. 3) synchronization characters (SYNC) generated by Remote Site 12. These synchronization characters synchronize Remote Site 12 with Central Site 10 in preparation for the transmission of the message from Remote Computer 18 to Data Communication Subsystem 30 and thence through transmission line 50 to Central Site 10. Next, a start of message character (SOM) is received from Remote Computer 18 whereby Data Communication Subsystem 30 is set up to act upon the subsequently received data characters (DATA) and end of message character (EOM). All 8 bit characters—see FIG. 3—from the start of message character (SOM) to the end of message character (EOM) are received by Data Communication Subsystem 30 from Remote Computer 18 in a parallel bit stream (character serial, character bit parallel message format) with block parity (LRC), character by character, generated and accumulated in Line Terminal Controller 36 and Line Terminal 53. The detection of the end of message character (EOM) causes the block parity character (LRC) to be the next character to be transmitted in the serial bit stream of information through transmission line 50 to Central Site 10.

The serial bit stream of information is accumulated character by character in Line Terminal 52 with the line parity (LRC) sum provided by Line Terminal Controller 34. Upon receipt of the block parity character (LRC) by Central Site 10 from Remote Site 12, Line Terminal 52 half-adds the transmitted block parity character (LRC) and its accumulated block parity (LRC) sum, and compares the half-add sum to zero which comparison if equal generates a Normal End status signal, but if unequal generates an Error Condition status signal causing Line Terminal Controller 34 to respond in an appropriate manner.

OPERATIONAL DESCRIPTION

Figure 5A:
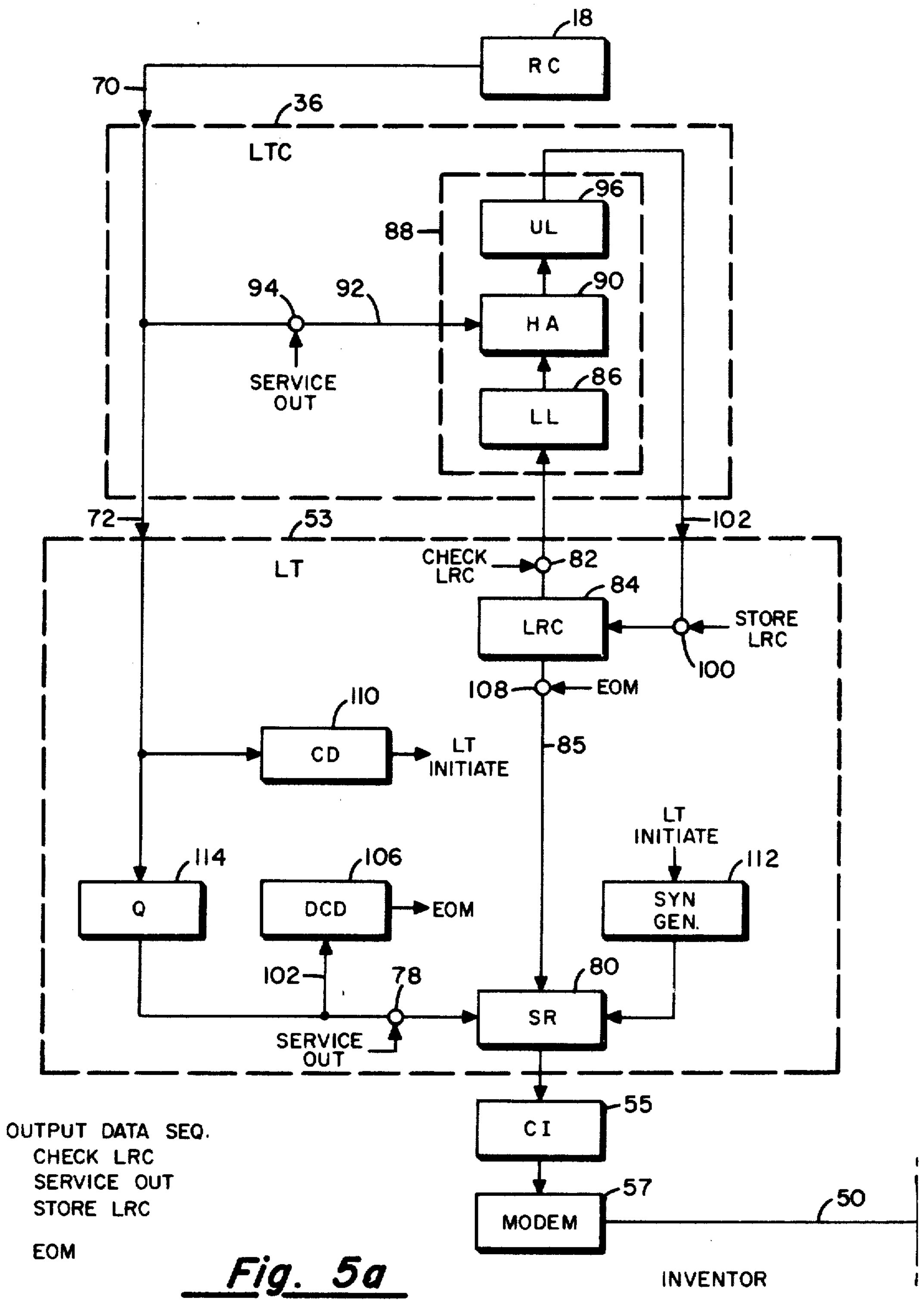
FIGS. 5*a*, 5*b* are block diagrams of the pertinent logic devices associated with the Line Terminal Controller, Line Terminal combinations at the transmiting and receiving sites discussed in the illustrated embodiment of the present invention.
Figure 5B:
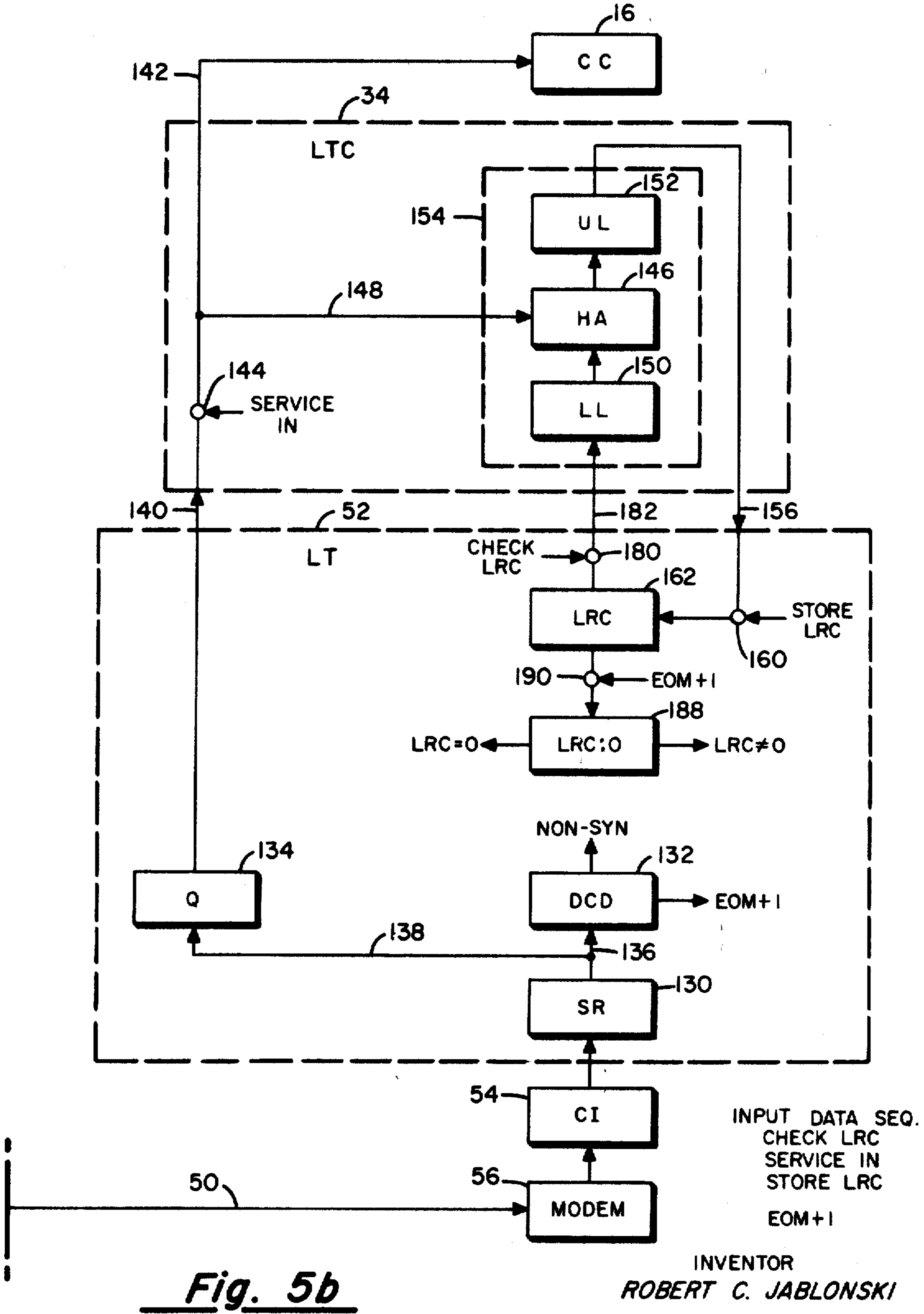

With particular reference to FIGS. 5*a*, 5*b* there are presented illustrations of the elements, comprising the transmitting and receiving sites, respectively, utilized in a message transmission. These figures are limited to the block diagrams of the pertinent logic devices associated with the Line Terminal Controller, Line Terminal combinations at the transmitting and receiving sites that are illustrated in FIGS. 1 and 2. As stated above, the present invention involves a scheme for generating and checking the block parity of multi-character messages transmitted between transmitting and receiving computers at separated computer sites in a multi-computer data processing system. As discussed above, the transmitting computer site generates block parity by half-adding successive characters in a multi-character message in a Three Level Half-Adder in the transmitting site Line Terminal Controller. Concurrently, a Three Level Half-Adder in a Line Terminal Controller at the receiving site performs a like operation upon the characters of the multi-character message as received. After completion of the transmission of the message from the transmitting site to the receiving site, generally upon determination of the end of message (EOM) character, the transmitting site sends its block parity, or message LRC sum, to the receiving site as the last character of the multi-character message. This message LRC sum from the transmitting site is half-added to the message LRC sum determined by the receiving site. The half-add sum of the two message LRC sums is compared to zero and the results of the comparison generate appropriate status signals which are, in turn, coupled to the receiving computer. Thus, discussion of the operation of the block diagram of FIGS. 5*a*, 5*b* shall start with a discussion of block parity generation in the transmitting site of FIG. 5*a* and then proceed to a discussion of the block parity generation in the receiving site of FIG. 5*b* and the checking, or comparison, of such two block parities at the receiving site.

Figure 1A:
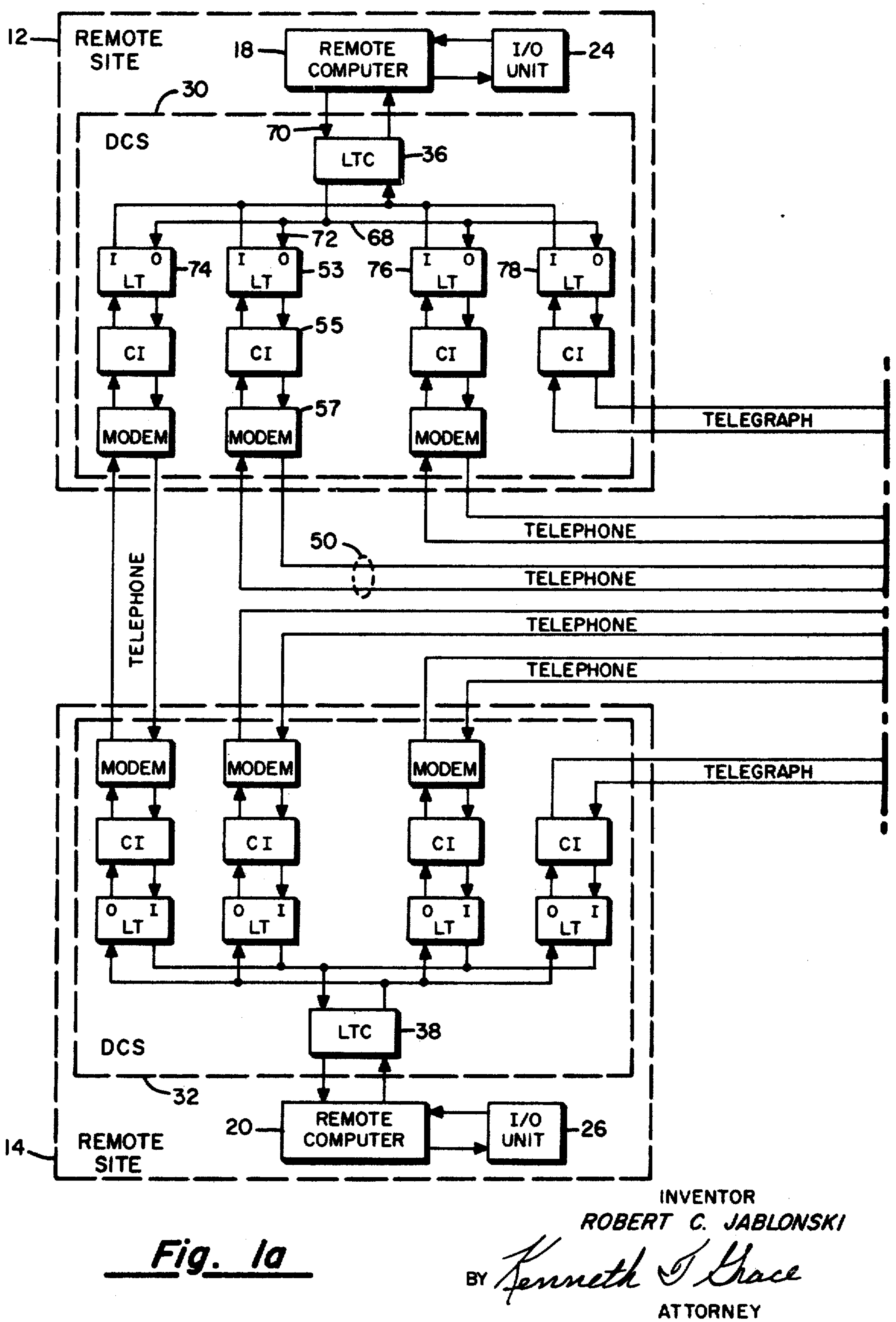
FIGS. 1*a*, 1*b* are block diagrams of a multi-computer data processing system in which the present invention is incorporated.
Figure 1B:
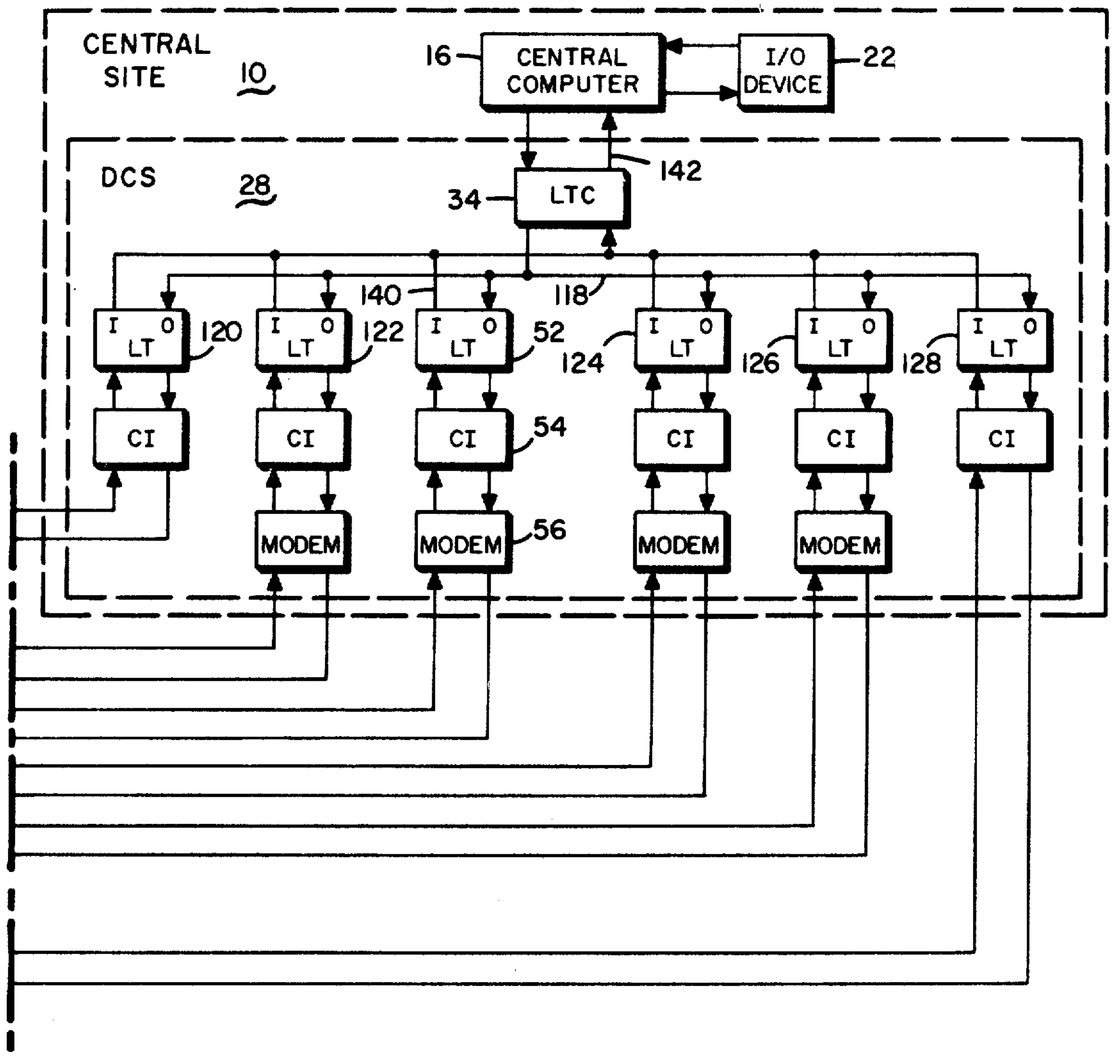

Initially, all the intercoupled sites 10, 12, 14 are turned on and may be considered to be in a ready status in preparation for the transmission of information, conforming to the message format of FIG. 4, between any two of the intercoupled sites 10, 12, 14. As discussedwith particular reference to FIG. 2, assume that Remote Site 12, in the to-be-discussed operation, is to transmit information to Central Site 10. To initiate transmission, Remote Computer 18 generates an Initial Selection Sequence whereby Line Terminal Controller 36 samples bus-out data line 70 for a Device Address designating a particular one of the Line Terminals 74, 53, 76, 78 that are parallel coupled to Line Terminal Controller 36 by bus-out line 68—see FIG. 1*a*.

With the particular Device Address specifying Line Terminal 53, Line Terminal Controller 36 initiates a Selection Sequence which activates Line Terminal 53—see FIG. 5*a*. During the Selection Sequence a Command Out signal from Remote Computer 18 is coupled to Command Decoder 110 (CD) which is caused to generate a Line Terminal initiate signal. The Line Terminal initiate signal conditions Line Termnal 53 for receipt of a message from Remote Computer 18 on lines 70, 72, initiating an Output Data Sequence, which includes requesting an output character (the first character of the message) from Remote Computer 18, and enables SYNC Generator 112 which initiates the generation of three consecutive SYNC characters. The three consecutive SYNC characters are coupled to Shift Register 80 (SR) which character bit serially couples the bits of the three SYNC characters to transmission line 50 and thence to the receiving site—see FIG. 5*b*—by way of Communication Interface 55 and Modem 57.

The Output Data Sequence, after an appropriate delay time to permit the generation and transmission of the three consecutive SYNC characters from Shift Register 80, requests the first message character, the SOM character, from Remote Computer 18 and at Check LRC time enables Gate 82 permitting LRC Register 84 (LRC) to couple its contents, which has been previously Master Cleared to be all zeros, to Lower Level 86 (LL) of Three Level Half-Adder 88.

Remote Computer 18 responds to an Output Data Sequence signal from Line Terminal Controller 36 by transmitting the first message character, the start of message (SOM) character, see FIG. 4, to Line Terminal Controller 36 on line 70 where it is coupled to Half-Adder Gates 90 (HA) by way of line 92 and to Q Register 114 (Q) in Line Terminal 53 by way of line 72. At Service Out time Gate 94 is enabled thus half-adding, in Half-Adder Gates 90, the contents of Lower Level 86 to the message character on line 92 causing Upper Level 96 (UL) to store the logical LRC sum thereof, which with Lower Level 86 having contained all zeros would be the SOM character as received on line 92. Concurrently, the message character, SOM character, has by way of line 72, Q Register 114 and Gate 78 been coupled to Shift Register 80 from which it has been character bit serially coupled to transmission line 50.

After the message SOM character has been stored in Shift Register 80, at Store LRC time Gate 100 is enabled permitting the present LRC sum held in Upper Level 96 to be coupled to LRC Register 84 by way of line 102. The storing of the present LRC sum in LRC Register 84 completes the block parity generation portion of the Output Data Sequence operation. Following the output of the last bit of the message SOM character from Shift Register 80 and thence to transmission line 50, the Output Data Sequence has been completed, and, accordingly, the Line Terminal Controller 36 initiates another Output Data Sequence.

During each Output Data Sequence the Data Control Decoder 106 is decoding the message character coupled to line 72 decoding the SYNC, SOM, DATA, EOM characters for the generation of appropriate control signals. The Data Control Decoder 106 for purposes of the present discussion may be considered to ignore all message characters except the EOM character which causes an EOM signal to be coupled to Gate 108 whereupon the contents of LRC Register 84 may be coupled to Shift Register 80 and thence character bit serially coupled to transmission line 50.

Successive Output Data Sequences as described above are repeated for each character of the message, from the SOM character through the last DATA character, whereupon Three Level Half-Adder 88 performs successive half-adds upon the successive message characters causing LRC Register 84, after receipt of the last DATA character, to hold the message LRC sum. Upon operation of each Output Data Sequence, the operation proceeds as described above wherein the LRC Register 84 is caused to contain the message LRC sum, from the SOM character through the EOM character. Upon the coupling of the EOM character to Data Control Decoder 106, Data Control Decoder 106 generates an EOM signal which is coupled to Gate 108 after LRC Register 84 contains the message LRC sum from SOM character through EOM character. After the EOM character has been character bit serially coupled to transmission line 50 by Shift Register 80 in the EOM Output Data Sequence, the EOM signal enables Gate 108 whereby the message LRC sum is coupled from LRC Register 84 to Shift Register 80 by means of line 114 from which it is character bit serially coupled to transmission line 50. This LRC character (the Longitudinal Redundancy Check or block parity character) is the last character making up the message format as transmitted from Remote Computer 18 to Central Computer 16—see message format of FIG. 4.

The receiving site 10—see FIG. 5*b*, including Central Computer 16 and Data Communication Subsystem 28, was turned on prior to the initiation of the transmission sequence from Remote Site 12. While turned on, Central Computer 16, through a priority network in Line Terminal Controller 34 has been sampling the bus-in lines 118 from Line Terminals 120, 122, 52, 124, 126, 128 for the possible reception of a message from one of the associated transmission lines from Remote Sites 12 or 14. The reception of two consecutive SYNC characters from transmission line 50, Modem 56 and Communication Interface 54, each of which SYNC characters has been assembled in Shift Register 130 (SR) and thence transferred to Data Control Decoder 132 (DCD) and Q Register 134 (Q), by way of lines 136, 138, respectively, has caused Data Control Decoder 132 to enable Line Terminal 52 to receive the incoming message on transmission line 50.

The reception of the first non-SYNC character, SOM character, of the message received from transmitting site 12 by receiving site 10 initiates the block parity checking operation. The SOM character is received by Line Terminal 52 character bit serially over transmission line 50 through Modem 56 and Communication Interface 54 where it is collected in Shift Register 130 of Line Terminal 52. From Shift Register 130 the SOM character is entered into the Data Control Decoder 132 by means of line 136 which recognizes it as a SOM character providing a non-SYNC signal output which causes Line Terminal 52 to initiate an Input Data Sequence.

The Input Data Sequence starts out with a Check LRC signal being coupled to Gate 180 on line 182. The Check LRC signal at Gate 180 causes the contents of LRC Register 162 (LRC) to be coupled to Lower Level 150 (LL) of Three Level Half-Adder 154 by way of line 182. With LRC Register 162 containing all zeros, it having been previously cleared by a Master Clear signal, after Check LRC time Lower Level 150 includes all zeros. Next, at Service In time a Service In signal is coupled to Gate 144 whereupon the SOM character held in Q Register 134 is coupled to Central Computer 16 by way of lines 140, 142 and to Half-Adder Gates 146 (HA) by way of lines 140, 148. At Half-Adder Gates 146 the contents of Lower Level 150 are added to the SOM character that is coupled to Half-Adder Gates 146 causing Upper Level 152 (UL) to contain the logical sum of Lower Level 150 and Half-Adder Gates 146, it being equal to the SOM character. Next, at Store LRC time a Store LRC signal is coupled to Gate 160 on line 156 causing LRC Register 162 to contain the present LRC sum. As noted, the present LRC sum as held in LRC Register 162 is equal to the SOM character.

The next message character, a DATA character received by Line Terminal 52 from transmission line 50 is entered character bit serially in Shift Register 130 as in the previous operation. When the full DATA character has been collected in Shift Register 130 its contents are coupled to Q Register 134 and Data Control Decoder 132 as in the previous operation. Data Control Decoder 132 decodes the DATA character as a non-SYNC character providing a non-SYNC signal output which causes Line Terminal 52 to initiate an Input Data Sequence.

As before, the Input Data Sequence includes the generation of a Service Request signal, which is coupled to Central Computer 16, and the generation of a Check LRC signal which is coupled to Gate 180 causing the present LRC sum held in LRC Register 162 to be transferred into Lower Level 150 of Three Level Half-Adder 156.

Next, at Service In time the contents of Q Register 134, the first DATA character of the received message, is coupled to Central Computer 16 by way of lines 140, 142 and to Half-Adder Gates 146 by way of lines 140, 148 when Service In signal enables Gate 144. The present LRC sum in Lower Level 150 and the DATA character on line 148 are half-added in Half-Add Gates 146 coupling a new present LRC sum to Upper Level 152 of Three Level Half-Adder 154. The Input Data Sequence continues at Store LRC time by the coupling of a Store LRC signal to Gate 160 permitting the present LRC sum to be coupled to LRC Register 162 by way of line 156. This sequence completes the Input Data Sequence with LRC Register 162 containing the present LRC sum of the characters, the SOM character and the DATA character, of the message received from the transmitting site 12.

Successive Input Data Sequences as described above are repeated for each character of the message, from the SOM character through the last DATA character, whereupon the Three Level Half-Adder 154 performs successive half-adds upon the successive message characters causing LRC Register 162, after receipt of the last DATA character, to hold the present message LRC sum. Upon the operation of each successive Input Data Sequence the operation proceeds as described above wherein the LRC Register 162 is caused to contain the message LRC sum from the SOM character through the EOM character. When the DATA Control Decoder 132 detects an EOM character, DATA Control Decoder 132 emits an $EOM+1$ signal which conditions Line Terminal 52 to execute two more Input Data Sequences; EOM Input Data Sequence, and LRC Data Sequence.

The EOM Input Data Sequence is similar to the Input Data Sequences described above with the present LRC sum held in LRC Register 162 constituting the generated message block parity, i.e., the LRC character generated by Line Terminal 52, which, if the received message is identical to the transmitted message, is equal to the transmitted LRC character which is the last character of the message format as transmitted by transmitted site 12 and as received by receiving site 10.

The LRC Input Data Sequence is similar to the Input Data Sequences described above with the transmitted LRC character received from Line Terminal 53 of transmitting site 12 being held in Q Register 134 and the generated LRC character generated by Line Terminal 52 of receiving site 10 being held in LRC Register 162. At Check LRC time the Check LRC signal enables Gate 180 permitting the generated LRC character held in LRC Register 162 to be coupled to Lower Level 150 of Three Level Half-Adder 156 by way of line 182. At Service In time the transmitted LRC character held in Q register 134 is coupled to Half-Adder gates 146 by way of lines 140, 148 when the Service In signal enables Gate 144. The generated LRC character held in Lower Level 150 and the transmitted LRC character on line 148 are half-added in Half-Add Gates 146 coupling the resulting Half-Add Sum to Upper Level 152 of Three Level Half-Adder 154.

The LRC Input Data Sequence continues at Store LRC time with the coupling of a Store LRC signal to Gate 160 permitting the Half-Add Sum held in Upper Level 152 to be coupled to LRC Register 162 by way of line 156. The LRC Input Data Sequence, after the usual Store LRC time, continues with the coupling of the $EOM+1$ signal to Gate 190. This enabling of Gate 190 couples the Half-Add Sum to Comparator 188. Comparator 188 compares the Half-Add Sum held in LRC Register 162 to zero whereupon if the Half-Add Sum is zero there is provided an $LRC=0$ signal, but if the Half-Add Sum is not zero there is provided an $LRC\neq 0$ signal.

The generation of an $LRC=0$ signal causes Line Terminal Controller 34 to couple a Normal Ending status signal to Central Computer 16 whereupon the received signal is recognized as having a correct parity check. Conversely, an LRC not=0 signal causes Line Terminal Controller 34 to generate an Error Condition status signal notifying Central Computer 16 that an error has occurred in the message as received from transmitting site 12.

Thus, it is apparent that there has been described and illustrated herein a preferred embodiment of the present invention that provides an improved scheme for generating and checking block parity of multi-character messages transmitted between computer sites in a multi-computer data processing system. It is understood that suitable modifications may be made in the structure as disclosed provided that such modifications come within the spirit and scope of the appended claims. Having, now, fully illustrated and described my invention, what I claim to be new and desire to protect by Letters Patent is set forth in the appended claims.

What is claimed is:

1. In a multi-computer data processing system, a plurality of computer sites intercoupled by a plurality of transmission lines, each of said computer sites including a computer and in intercoupled line terminal controller which, in turn, is coupled to a plurality of line terminals for transmitting and receiving an information message over said transmission lines, the system including:

a computer site including a computer and an intercoupled data communication subsystem;

said data communication subsystem including a line terminal controller for selectively activating one of a plurality of transmitting and of receiving line terminals that are coupled thereto for transmitting and receiving, respectively, an information message over a respectively associated transmission line;

said information message having a format comprising the consecutive transmission of a plurality of multi-bit characters in a character serial, character bit serial manner;

said line terminal controller including a three level half-adder including, a lower level register, half-adder gates and an upper level register; each of said transmitting line termainls including, and LRC register and a shift register;

check LRC means for transferring a character from said LRC register into said half-adder lower register;

service out means for transferring a first character of said message into said shift register for character serial, character bit serially coupling said first character to said transmission line and into said half-adder gates for half-adding said first character to said character in said half-adder lower register for causing the LRC sum thereof to be transferred into said half-adder upper register;

store LRC means for transferring said LRC sum from said half-adder upper register into said LRC register;

said line terminal controller and said selected transmitting line terminal causing said check LRC means, said service out means and said store LRC means to cycle through said message from said first character to a last character for causing the message LRC sum thereof to be transferred into said LRC register; and EOM means for transferring said message LRC sum from said LRC register into said shift register for character bit serially coupling message LRC sum to said transmission line as a last character +1 character.

2. In a multi-computer data processing system, a plurality of computer sites intercoupled by a plurality of transmission lines, each of said computer sites including a computer and an intercoupled line terminal controller which, in turn, is coupled to a plurality of line terminals for transmitting and receiving an information message over said transmission lines, the system including:

a computer site including a computer and an intercoupled data communication subsystem;

said data communication subsystem including a line terminal controller for selectively activating one of a plurality of transmitting and of receiving line terminals that are coupled thereto for transmitting and receiving, respectively, an information message over a respectively associated transmission line;

said information message having a message format comprising the consecutive transmission of a plurality of multi-bit characters in a character serial, character bit serial manner;

said line terminal controller including a three level half-adder including a lower level register, half-adder gates, and an upper level register; each of said receiving line terminals including, an LRC register, a shift register, a Q register, a data control decoder, and an LRC comparator;

said respectively associated transmission line coupling said information message to said shift register in a character serial, character bit serial manner;

said shift register coupling said information message to said Q register and to said data control decoder in a character serial, character bit parallel manner;

check LRC means for transferring a character from said LRC register into said lower level register;

service in means for transferring a first character of said message from said Q register into said computer and into said half-adder gates for half-adding said first character to said character in said half-adder lower register for causing the LRC sum thereof to be transferred into said half-adder upper register;

store LRC means for transferring said LRC sum from said half-adder upper register into said LRC register;

said line terminal controller and said selected receiving line terminal causing said check LRC means, said service in means and said store data means to cycle through said message from said first character through a last character +1 character for causing the half-add sum thereof to be transferred into said LRC register;

EOM+1 means;

said data control decoder decoding said last character for coupling a last character+1 signal to said EOM+1 means for transferring the half-add sum held in said LRC register into said LRC comparator;

said last character+1 signal enabling said LRC comparator to compare the half-add sum received from said LRC register to 0 for generating an LRC 0 or an LRC 0 signal as a result of said comparison.

References Cited

UNITED STATES PATENTS 3,343,135 9/1967 Freiman et al.
3,319,226 5/1967 Mott et al.

GARETH D. SHAW, Primary Examiner

U.S. Cl. X.R.

340—146.1

UNITED STATES PATENT OFFICE

CERTIFICATE OF CORRECTION

Patent No. 3,525,077 August 18, 1970

Robert C. Jablonski

It is certified that error appears in the above identified patent and that said Letters Patent are hereby corrected as shown below:

Column 11, line 52, before "format" insert -- message --; line 59, "termainls" should read -- terminals --. Column 12, line 64, "LCR 0" should read -- LCR = 0 --; line 65, "LCR 0" should read -- LCR ≠ 0 --.

Signed and sealed this 2nd day of March 1971.

(SEAL)
Attest:

Edward M. Fletcher, Jr.
Attesting Officer

WILLIAM E. SCHUYLER, JR.
Commissioner of Patents